May 26, 1959
E. E. FLORENCE
2,888,098
LUBRICATION SYSTEM
Filed July 27, 1954
2 Sheets-Sheet 1
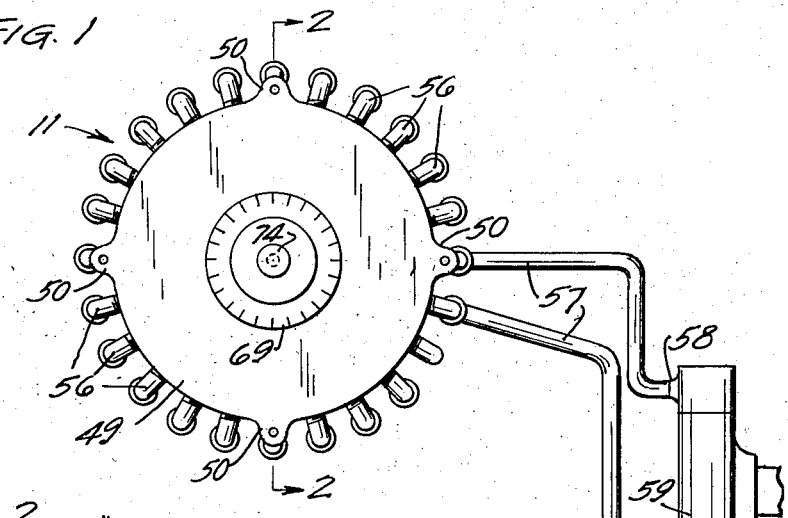
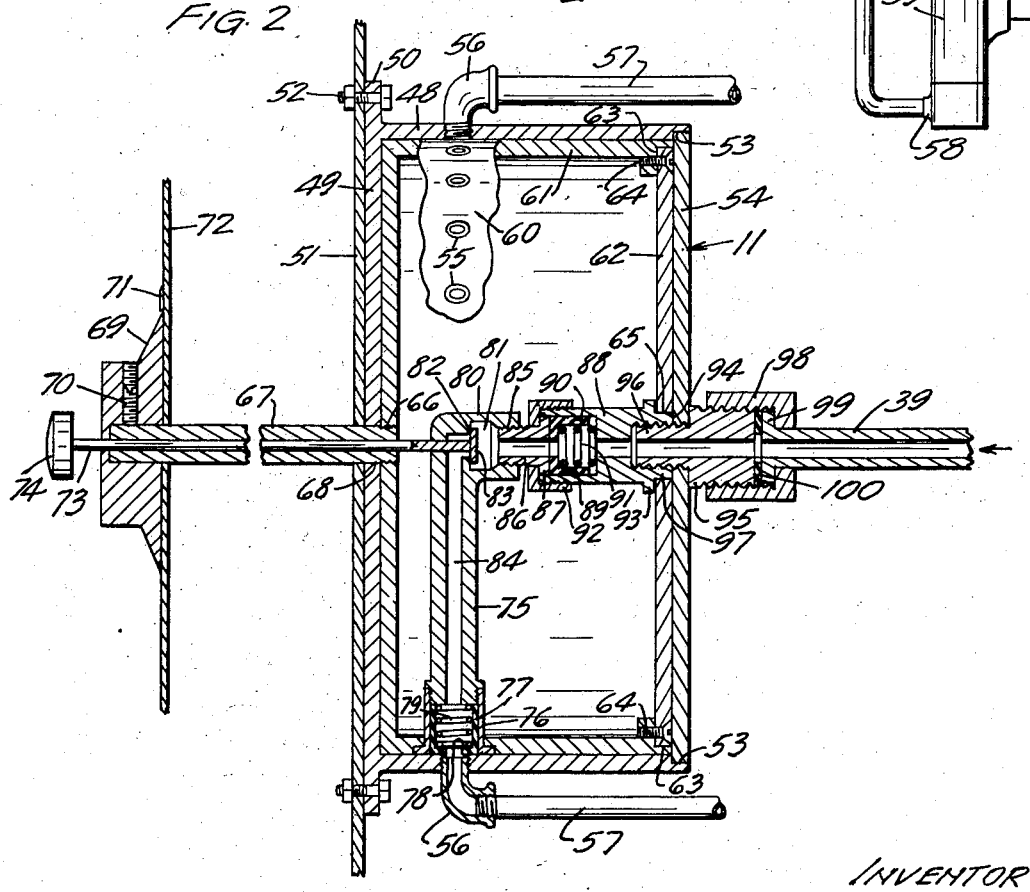
INVENTOR
By Estel E. Florence
Williamson, Williamson, Schroeder & Adams
ATTORNEYS May 26, 1959  E. E. FLORENCE  2,888,098
LUBRICATION SYSTEM
Filed July 27, 1954 2 Sheets-Sheet 2
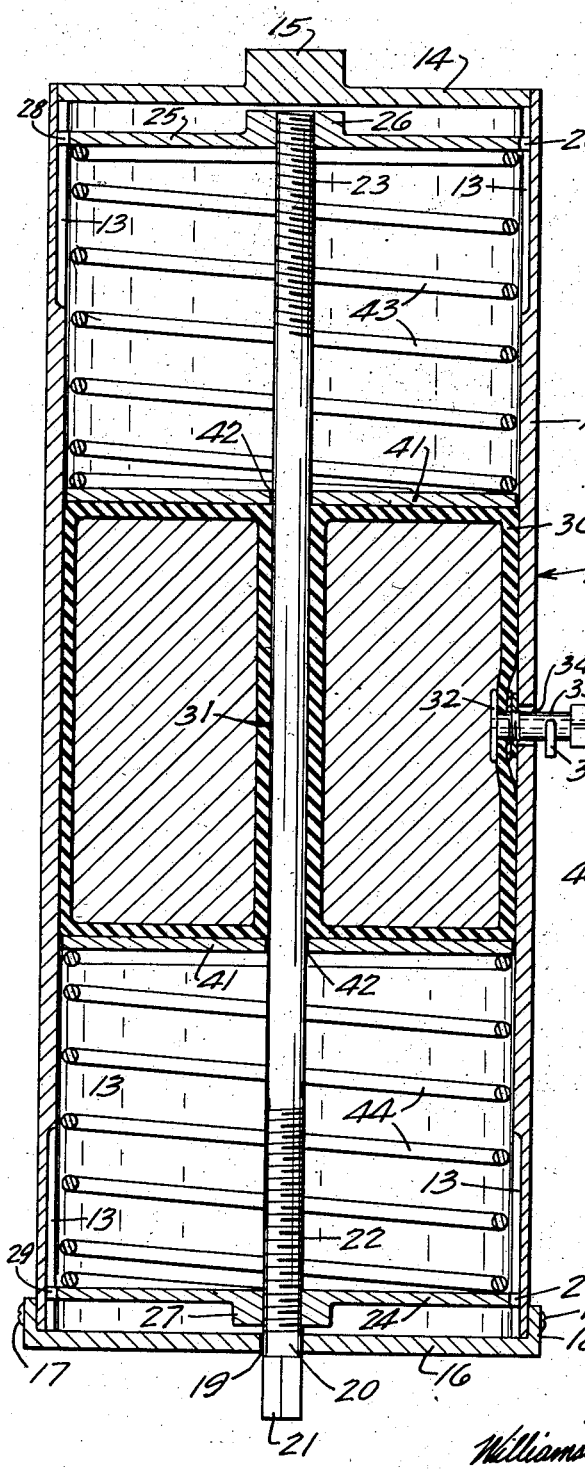
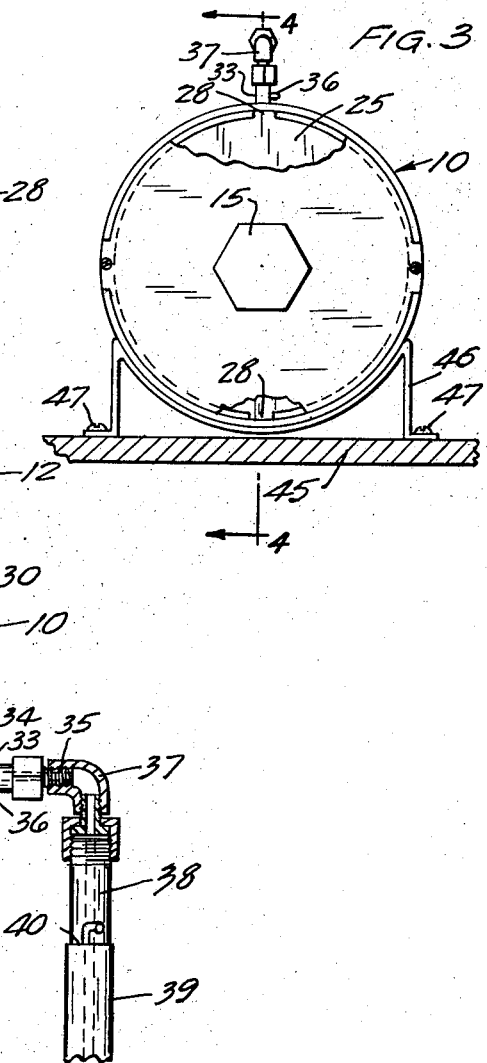
INVENTOR
Estel E. Florence
BY
Williamson, Williamson, Schroeder & Adams
ATTORNEYS _United States Patent Office_

2,888,098
Patented May 26, 1959

2,888,098

LUBRICATION SYSTEM

Estel E. Florence, Buffalo, Minn.

Application July 27, 1954, Serial No. 446,068

4 Claims. (Cl. 184—7)

This invention relates to a lubrication system and more particularly to an attachment assembly arranged for instantaneous greasing and lubrication of any point in a machine which is adapted to be lubricated by pressure.

In conventional practice, machines with moving parts are provided with grease fittings and the like for independent treatment with a device such as a grease gun. The discharge end of the grease gun may be pressed upon the fitting or attached in interconnecting relation therewith prior to the application of grease under pressure. The job of lubricating and greasing machinery such as automobiles is a laborious and inconvenient job and requires skillful handling in order that the proper lubricant be supplied to each of the fittings so as to preserve the life and good operation of the machine. As a rule, it is not convenient for the operator of an automobile to lubricate the vehicle at periodic intervals and hence it is not unusual for the lubricating job to be delayed until some noticeable feature in the operation of the vehicle calls to attention its lack of lubrication. Even when a machine such as an automobile is lubricated by an expert, certain positions of equipment with lubricating fittings are missed accidentally or may be deliberately overlooked because they may be difficult to reach and service.

It is a general object of this invention to provide a convenient and efficient lubricating system in the form of multiple attachment to each point of lubrication for the quick and timely lubrication of any and all of the parts requiring it.

More specifically it is an object of the invention to provide a lubricating system having pre-attached tubular lines established to all points requiring lubrication and means for selectively supplying lubricant under pressure to any of the points.

Another object of the invention is to provide a remote control for a lubrication system of the class described in which grease or other lubricant stored under constant pressure may be supplied selectively through individual lines for the independent treatment of points requiring lubrication according to the nature of the part to be lubricated.

These and other objects and advantages of the invention will more fully appear from the following description made in connection with the accompanying drawings, wherein like reference characters refer to the same or similar parts throughout the several views, and in which:

Fig. 1 is an end view of the selector and control element in my invention, representative tubular interconnections being shown to two of the outlets in diagrammatic interconnection with a machine part to be lubricated;

Fig. 2 is an enlarged vertical section of the selector and control element taken on the line 2—2 of Fig. 1, certain portions being cut away to better show the interrelationship of the parts and other portions adjacent the section line being shown in full;

Fig. 3 is an end view of the lubricant container, portions of the container wall being cut away to show the internal structure; and Fig. 4 is an enlarged vertical section through the container taken on the line 4—4 of Fig. 3, portions of the structure adjacent the vertical section being shown in full line and other unessential portions being eliminated.

With continued reference to the drawings, my invention contemplates the employment of a container for retaining lubricant under continual pressure indicated generally at 10 in Figs. 3 and 4, and a selector and control element indicated generally at 11 and shown in Figs. 1 and 2. The container 10 has an outer housing or shell 12 which is cylindrical in shape and is provided longitudinally and diammetrically at each end with longitudinal guide slots 13 as shown in Fig. 4. An end plate 14 is secured to the cylindrical portion 12 and may have formed integrally therewith and axially of the cylinder, a hexagonal boss 15 adapted to receive an ordinary wrench tool. The other end of the container has a cap 16 which is adapted to be secured to the outer peripheral end of container 12 by such means as screws 17 passing through a flange member 18 thereof and cooperating with the housing wall 12 to hold the cap in secure relation. An opening 19 is formed axially of cap 16 for receiving a rod or shaft 20, the outer exposed end 21 of which has flat surfaces adapted to receive a wrench or similar tool. The shaft 20 extends axially of the cylindrical housing 12 and is threaded at both ends, the threaded area 22 being an ordinary right-hand thread and lying adjacent the cap 16, while the opposite end has a threaded area 23 of a left-hand type. Adapted to threadably engage each of the threaded areas 22 and 23 are respective flange members 24 and 25. A medial threaded boss area 26 engages with the left-hand thread 23 and a similar threaded boss 27 on the flange 24 engages the threaded area 22. The flange 25 is slidably disposed within the cylindrical housing 12 and has a pair of ears 28 which are adapted to be slidably received within the guide slots 13 and to prevent the flange 25 from rotating. The flange 24 has similar ears 29 which are slidably received within the guide slots 13 disposed at the opposite end of the cylindrical housing. The flange members may reciprocate inwardly and outwardly but are prevented from rotating by virtue of the slidable connections between the respective ears 28 and 29 and the guide slots 13 formed at the inner surface of housing cylinder 12. In the arrangement shown, when shaft 20 is rotated in a counterclockwise direction as viewed from the lower end in Fig. 4, the flanges 24 and 25 are moved convergently while the reverse rotation of shaft 20 will cause the flanges 24 and 25 to diverge. Medially of the cylindrical housing 12 and in internal circumferential engagement therewith, is a resilient fluid retaining member or bladder 30 having a central opening 31 passing through the bladder 30 without piercing the walls thereof. An outlet 32 is secured to the bladder 30 and communicates with the inside thereof as shown in Fig. 4. The outlet 32 has an outwardly extending nipple 33 which is received in and passes through an opening 34 formed medially through the wall 12 of the container 10. The outlet 32 is threaded at its outwardly extending tubular end 35 and has a small shut-off valve 36 disposed between the inner end and the outer end as shown. A tubular interconnection with the threaded end of the outlet 32 may constitute a fixture such as elbow 37 and the tubular adaptor 38 which is threadedly received in fluid communication with the elbow 37 and the outlet 32. A tubular line 39 may be supplied for a snap connection at 40 with the adaptor 38 and carries lubricating fluid from the bladder 30 to the selector and control element 11 as will be subsequently described.

The resilient bladder 30 has a general doughnut shape and is engaged at each side by a circular bearing plate 41, each of the bearing plates 41 having a central opening 42 for slidably receiving the shaft 20. Interposed between the threaded flange 25 and bearing plate 41 is a compression spring 43, and similarly positioned at the opposite end of the container is a second compression spring 44 which is interposed in turn between the threaded flange 24 and its associated bearing plate 41.

The container 10 may be secured in any convenient location to a supporting structure 45 by such means as the bracket or cradle member 46 having fastening elements such as screws 47 securing the bracket to the supporting structure 45. The supporting structure 45 may be the forward portion of an automobile floorboard or such other location as the floor of the trunk of an automobile. It is understood, of course, that the tubular interconnecting line 39 may be of any convenient length and hence the location of the lubricant container 10 is not critical to the operation of the invention.

As previously pointed out, the tubular interconnection 39 leads to the selector and control element 11 which is set forth in detail in Figs. 1 and 2. The selector and control element has a manifold 48 which is preferably constructed in the shape of a drum, one side 49 of which has an outwardly extending flange 50 adapted to be mounted to a mounting panel 51 by such means as bolts 52, and the other side having a shouldered annular groove 53 which is adapted to rigidly receive a circular plate 54 as shown in Fig. 2. The manifold 48 has a multiplicity of spaced circumferential orifices 55, each of which in turn receives a threaded fixture 56 which is adapted to be secured to a tubular member 57. Each tubular member 57 communicates with a lubricating fitting 58 attached to a machine part 59 in appropriate location for properly lubricating the part. The inner surface of the manifold 48 constitutes a bearing plate 60 in the vicinity of the orifices 55.

Mounted within the manifold 48 is an injector member 61 which is preferably in the form of a smaller drum mounted for rotation in close sliding relation with the internal surface of manifold drum 48. Injector member 61 may be provided with an end plate 62 which is secured to a shouldered annular edge 63 by means of screws 64 as shown in Fig. 2. A central opening 65 is disposed through the plate 62, and in axial alignment therewith is a threaded opening 66 which is adapted to receive a threaded tubular member 67 which passes through an opening 68 formed through the manifold drum 48 and which passes through the mounting plate 51 as shown. A manual turning knob 69 is secured to the tube 67 by such means as set screw 70 and has a pointer 71 associated with fixed panel 72 for locating and indicating the relative radial position of the injector member 61 which is drivably connected therewith. The dial member 69 slidably and axially receives a plunger 73 which terminates outwardly in a thumb button 74 as shown in Fig. 2.

The injector 61 has a radial tubular arm 75 which extends outwardly and is secured to an interconnecting tube 76 which in turn is mounted within the outer drum portion of injector 61 in fluid communication with the tubular injector arm 75. A resilient sleeve 77 is mounted within the short tube 76 and has an outwardly facing annular shoulder 78 which is adapted to lie in sliding engagement with the bearing surface 60 as shown. A compression spring 79 maintains the resilient sleeve 77 in fluid-tight contact with the bearing surface 60 at all times. The sleeve 77 is adapted to align with the orifices 55 and communicates with the internal tubular portion of injector arm 75 so as to constitute an injection port for admitting lubricating fluid through the injector arm to any one of the fixtures 56 and to thereby force lubricating fluid into an interconnecting tube 57 and thence to the lubricating fitting 58 as previously described.

The inner end of the injector arm 75 terminates in a short L-shaped tube 80 and has an enlarged bore 81 and a shouldered surface 82 over which a valve 83 normally lies in sealing relation with the tubular passageway 84 which extends internally of the injector arm 75. The valve 83 is secured to the plunger rod 73 which in turn slidably passes through the injector arm 75 in axial alignment with the short right angled portion 80. The right angled portion 80 terminates in an internally threaded end at 85 which in turn is threadably secured to a nipple 86. The nipple 86 has an annular flanged terminus 87 which is rotatably received within a tubular stub shaft 88 at an internally enlarged end portion 89. A circular cup gasket 90 lies within the enlarged area and is pressed outwardly against the flange end of nipple 86 by means of compression spring 91. A threaded cap 92 retains the threaded nipple 86 in rotatable and fluid-tight relation with the tubular stub shaft 88. Tubular stub shaft 88 has a flanged collar 93 which lies in bearing engagement against plate 62 and a reduced and internally threaded end 94 is received axially and rotatably within the central opening 65 formed in plate 62. A tubular connector 95 has a reduced tubular threaded end 96 which is threadably secured to the threaded end of the tubular stub shaft 88 and maintains the stub shaft 88 rigidly mounted with respect to the drum manifold 48 at the external end of the removable plate 54 as shown. The reduced end 97 on stub shaft 88 provides a bearing in conjunction with the opening 65 through plate 62. The tubular connector 95 in turn is threadably connected through the union 98 to the flared end 99 of tubular interconnector 39. A sealing gasket 100 may be interposed in the union 98 as is common in the art.

In the use and operation of my attachment assembly, a quantity of lubricating fluid such as grease is supplied within bladder 30 with the outlet 32 positioned so as to extend through opening 34 in the container 10. The bearing flanges 41 are inserted in the position shown with the compression springs 43 and 44 in endwise pressing engagement against the bladder. The shaft 20 is rotated so as to draw in the flanges 24 and 25 respectively, the housing 12 being maintained against rotation by means of a wrench applied to boss 15 and another wrench or turning element applied to the squared end 21 of shaft 20 for applying pressure via compression springs 43 and 44 to the bladder 30. As will be evident, the lubricating material placed in the bladder 30 will be maintained under continual pressure and supplied through the tube 39 to the selector and control element 11.

Each of the multiple tubular outlet members 57 is secured to a fixture 56 at one end and to a lubricating fitting 58 at the other end. Since each of the fixtures 56 is in tubular communication with an orifice 55, the injector passageway and port 84 may be aligned and registered with any one of the orifices 55 by rotating the dial element 69. As each selector position is established, the valve 83 may be released by actuating the plunger 73 at the thumb button 74 and a shot of lubricating grease will be supplied through the port and registered orifice through the appropriate tubular line 57. Since indicia may be supplied to identify each of the orifices 55, the user may apply lubricating fluid for the desired length of time, depending on the requirements of the particular lubricating fitting.

It will, of course, be understood that various changes may be made in the form, details, arrangement and proportions of the various parts without departing from the scope of my invention.

What is claimed is:

1. A device for attachment for lubrication lines of mechanisms for supplying lubricant under pressure thereto, said device comprising a casing member, a resilient bladder for containing grease and the like mounted within said casing and having side portions in engagement with the casing, and said bladder also having end portions, compression means mounted within said casing and having spaced portions bearing against opposite end portions of said bladder and urging the end portions together to thereby place said bladder and grease under pressure, and outlet means communicating with the interior of said bladder whereby to permit the passage of grease under pressure therethrough and into said lubrication lines.

2. The device set forth in claim 1, wherein the compression means include a pair of opposed compression springs bearing convergently against said spaced portions, and said compression means also including adjustable anchoring means connected with said springs to adjust the pressure on the bladder.

3. An attachment for an automobile to supply grease to the fittings at several grease points, said attachment having in combination a housing attached to the automobile and having a supply of grease therein and also having resilient mechanical means continuously applying pressure to the grease supply, conduit means connected with the housing and communicating with the grease under pressure, a grease distributing mechanism having a plurality of outlets each connected with a respective fitting of the automobile to supply grease thereto, said distributing mechanism having movable injector means including a grease control flow valve, said injector means being connected with the conduit means and also being connectible with the outlets, one at a time, for supplying grease thereto, and control means for moving said injector means and for operating the grease control flow valve.

4. A control device for supplying grease under pressure to one of a number of fittings, comprising a cylindrical housing having a plurality of peripherally spaced ports in the cylindrical wall, a rotor in the housing and having a radial grease-flow opening in alignment with one of the ports and movable into registration with the other ports, the housing having a grease inlet at one end in flow communication with the radial flow opening of the rotor, the rotor having an elongate axial control portion extending through the other end of the housing for revolving the rotor, a valve in the rotor for controlling flow through the radial opening, and an elongate and movable control for the valve extending concentrically of the rotor control portion, whereby the rotor and valve may be controlled from a position remote from the housing.

References Cited in the file of this patent

UNITED STATES PATENTS

| 1,476,946 | Bessesen | Dec. 11, 1923 |
| 1,577,936 | Skelly | Mar. 23, 1926 |
| 1,811,958 | Murphy | June 30, 1931 |
| 1,887,199 | Gilliam | Nov. 8, 1932 |
| 2,096,397 | Harris | Oct. 19, 1937 |
| 2,235,897 | Moore | Mar. 25, 1941 |
| 2,700,984 | Gleasman | Feb. 1, 1955 |

FOREIGN PATENTS

| 14,159 | Great Britain | of 1911 |
| 223,114 | Great Britain | Oct. 16, 1924 |
| 632,383 | Great Britain | Nov. 28, 1949 |